Figure 7:
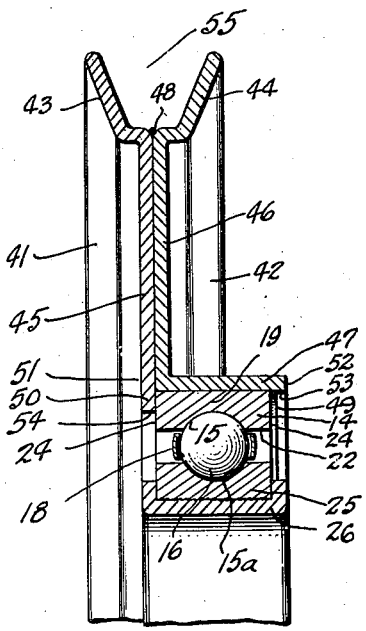

May 23, 1944.    G. H. KENDALL    2,349,281
PULLEY BEARING
Filed Feb. 7, 1942    2 Sheets-Sheet 1
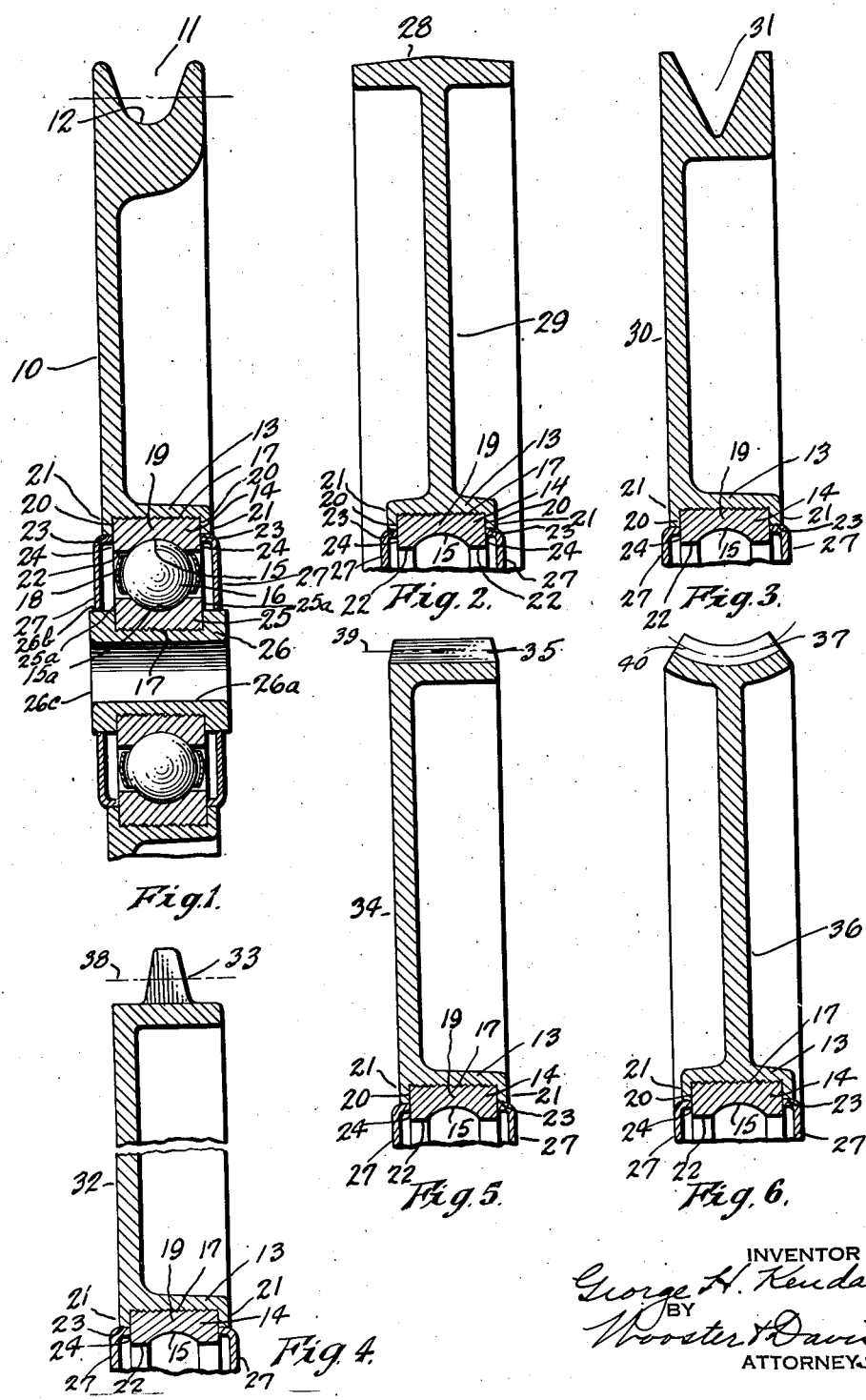
INVENTOR
George H. Kendall
BY
Wooster & Davis
ATTORNEYS.

May 23, 1944.     G. H. KENDALL     2,349,281
PULLEY BEARING
Filed Feb. 7, 1942     2 Sheets-Sheet 2

INVENTOR
George H. Kendall
BY
Wooster Davis
ATTORNEYS.

Patented May 23, 1944

2,349,281

UNITED STATES PATENT OFFICE 2,349,281

PULLEY BEARING

George H. Kendall, Noroton Heights, Conn.

Application February 7, 1942, Serial No. 429,877

7 Claims. (Cl. 308—191)

This invention relates to antifriction bearings for idler pulleys and similar devices. It is an object to provide improved construction of such devices which comprise a standard proportioned antifriction bearing having integrally or permanently incorporated therewith a pulley or similar device as a part of the permanent construction of the bearing.

It is also an object to provide a much simplified construction, and especially one in which much greater accuracy is secured in the finished article, particularly in the relations of the driving and bearing surfaces, that is, exact positioning of the belt and sprocket pitch lines, gear pitch lines, and so forth, with respect to the raceway for the rolling elements, with much fewer chucking and finishing operations than with the standard constructions now generally employed.

The primary object is to provide a bearing comprising a bimetal construction in which the pulley or similar device is an integral part of the bearing and so arranged that the face or peripheral driving or driven portion of the pulley, sprocket, gear or similar device may be without difficulty located in exact radial and axial concentric alignment with the track or raceway for the rolling elements.

A further object is to provide a construction in which the driving peripheral portion of the pulley or similar article over which the belt, cable or similar driving means runs can be made a permanent and integral part of the antifriction bearing.

With the foregoing and other objects in view I have devised a construction several examples of which are illustrated in the accompanying drawings forming a part of this specification, it being, however, understood that the invention is not limited to the specific construction and arrangement shown, but may involve various changes and modifications within the scope of the invention.

In the drawings, Fig. 1 is a transverse section through an antifriction bearing including a grooved idler pulley constructed in accordance with this invention;

Figs. 2 to 7 are similar sections of the upper portion of similar devices showing how the invention can be employed with different types of pulleys and similar devices.

This application is a continuation in part of my prior applications Serial No. 357,107, filed Sept. 17, 1940, and Serial No. 408,267, filed August 25, 1941.

Throughout the specification and claims the term "pulley" is used in a generic sense as including rotatable circular members having various shaped peripheries adapted to cooperate with different types of driving means running thereon, such as grooved, flat, or V-shaped, for running with cables, belts, etc., as well as sprockets over which chains may run, and various types of gears, for example spur or worm gears, and similar devices.

The invention relates primarily to antifriction bearings in combination with such devices as an integral part thereof, and although in the drawings a ball bearing is illustrated the construction is equally adapted for any roller type of antifriction bearing, such for example as cylindrical, needle, taper, spherical, concave, etc., and may be employed for either radial, thrust, or radial-thrust bearings.

The present standardized antifriction bearing construction consists of two special alloy steel rings between which the rolling elements run and hardened and normalized to produce an extremely hard surface for the balls or other rolling elements to roll upon in carrying the load. This extreme degree of hardness was found to be of first importance to carry the rated load of the bearing and as necessary to prevent damage to the ring raceways by denting from the ball or roller, or by imprinting from them through rough handling or abuse of the equipment in which the bearing was mounted. This will be readily apparent when it is realized that there is a very small area of the ball or roller in contact with the raceway surface which must carry the load imposed.

The manufacture of these bearings involves turning the bearing rings of very tough steel from heavy bars, forgings or from very heavy steel tubes, with a waste of nearly one-half or over (depending on the size) of the weight of the steel in chips, cut-off ends, etc. Furthermore they require many additional finishing operations, including a large number of chucking operations as well as actual work on the metal surfaces to bring the piece to the finished size.

I have found that a raceway surface can be provided and maintained at the present necessary degree of hardness in a ring made of the special tough steel of a thickness as provided by the stress formulas of Streibeck and Hertz to carry the rolling load, and that the small balance of the usual size bearing ring shape can be made of softer and more readily workable material than the tough machining alloy steel at present used in solid bearing members, as the load carried by the raceway ring would be distributed over large areas. Because of this construction the remaining portion of the bearing carrying the raceway ring can be formed or molded and thus extended to the shape and size of the finished article, such for example as a pulley or similar article in which the antifriction bearing is to be used. Thus, this raceway ring of tough hardened steel or similar material can be cast or molded in a supporting or mounting ring member, which is also formed or extended to the size and shape of the finished article, in a die casting machine, plastic molding machine by the permanent mold method, or the centrifugal mold method, to produce pulleys or similar articles including an integral bearing ring having an insert raceway ring of the necessary hardness and toughness. This permits the use of softer and cheaper materials for the cast or molded or otherwise formed ring support and pulley body, and the insert raceway ring of tough hardened steel or similar material can be cast or molded into this material and properly and accurately positioned and anchored in or bonded to the supporting material by the casting and molding operation. This construction also eliminates a large number of chucking and finishing operations required in making the standard antifriction bearing, insuring greater accuracy with less difficulty and liability of error, particularly the relation of the driving surfaces with respect to the rolling surfaces of the bearing, and permitting manufacture at much less cost.

The figures of the drawings illustrate by way of example a number of different articles, such as pulleys and similar devices, for which this novel construction may be used.

Referring first to Fig. 1, the bearing includes a central hub or ring portion 13 forming the backing or supporting element or portion, of the outer section of an antifriction bearing, this hub or ring section being extended to form the body of the pulley as indicated at 10 having in its periphery a tapered groove 11 with a rounded bottom 12 for running of a cable or similar member. The body 10 may be a continuous or open web, spokes or similar structure, the term "web" being used in a generic sense to include the different ones. The ring section may form the hub of the pulley, and mounted in it and permanently bonded to it is the insert ring 14 of the bearing forming a raceway track 15 for the balls or other rolling elements 16. The ring portion 13 including the body portion 10 can be made of cast or molded material, and this material is cast or molded about the insert raceway ring 14. This material may be cast or molded about the ring 14 in any suitable manner, such for example as in die-cast molds in die-casting machines, suitable molds in plastic molding machines, by casting in permanent molds, by casting by centrifugal mold methods, or powdered metal pressure molding or casting, and it is preferred that the surface of the insert ring at the opposite side from the rolling track for the balls or other rolling elements be knurled or otherwise roughened, as indicated at 17, so that the cast or molded material will run into the depressions in the knurled or roughened surface to form a better bond between the insert raceway ring and the backing-up or mounting material. Thus the raceway ring is permanently bonded to the backing and supporting ring section so that it cannot be shifted or removed.

The raceway ring 14 would ordinarily be made of the special tough steel alloys now generally employed for the ring members of the standard ball and roller bearings, and which can be treated to give the necessary hardness to the surface on which the rolling elements roll. These rings can be cut from steel tubing of the proper size and formed to shape, or they may be made from strip steel rolled into a circle and welded at the abutting ends to make a one-piece solid ring, or made from flat wire or sheet or seamless swaged or welded pipe or tubing, as illustrating some of the possible forms of fabrication. They can also be made by cold forming, by hot or cold steel fused at ends to make a fully continuous ring, by stamping, forging or turning methods, etc., as may best lend itself to the particular size, quantity, application or condition of manufacture. The rings are properly finished and hardened and then are held in the proper location in the mold by suitable holding and locating means, and the other material forming the backing and supporting material is poured into the mold or molded about the ring with suitable pressure.

The balls 16 in Fig. 1 are shown in the usual retainer 18 such as used in the standard ball and roller bearings, comprising for example two strips of steel stamped from sheet metal and formed and secured together by rivets or other suitable means (not shown) to retain the balls in proper alignment. These retainer elements can be made from strip metal formed to shape and their free ends welded or soldered to make continuous rings and eliminate the waste incident to stamping them from sheet metal. This retainer can be omitted if desired, as where the balls are in contact.

This process and construction uses the same basic function for its bimetallic and bimaterial construction as the present standardized antifriction bearing construction as far as sizes and materials of the raceways, balls and retaining elements are concerned. That is, no attempt is made to alter the function or performance of the balls or rolling elements.

The improved bearing steels of today make possible far greater load-carrying capacity for given bearing size load ratings so successfully established and accepted by all industries over the entire world. These established sizes therefore do not require a bearing ring thickness as great as when the sizes were initially established. A small part of the standard size ring may therefore be made of other material without affecting the proper raceway load-carrying functions in the slightest degree. Thus, in this construction the small balance (represented by the ring portion 13) of the standard section over that of the raceway ring is supplied by softer and more easily workable material, yet fully capable of conservative support of a required load, making possible major reductions in cost of fabrication of pulleys and similar articles with antifriction bearings of all types and sizes permanently incorporated therein and as a part thereof, including such as cylindrical, needle, spherical, conical or tapered rollers as well as balls. The insert ring 14 of hardened metal is made of a thickness at its thinnest point 19 to carry the rolling load as conservatively figured by the established formulas of Streibeck and Hertz for standard, solid one-piece bearings, so that this insert ring is capable of carrying the rolling load independently of the backing or supporting member. The backing or supporting member 13 may be employed to fill out the size of bearing ring members to the standard size of the standard bearing of the one-piece solid hardened metal bearings which have been adopted as standard in industries throughout the world, in a far more economical manner than present processes of finishing. This backing ring section may, however, be made thicker if desired, and to any size found advisable, which of course would involve greater weight and require the use of more material.

It will be seen that the insert ring 14 forming the raceway for the rolling elements is of less width than the supporting or backing member 13 so that the sides 20 of the insert ring are spaced inwardly from the sides 21 of the backing member. It will also be noted that in this construction the diameter of the face 22 of the insert ring on which the raceway or rolling surface 15 is located is of a different diameter from that of the adjacent surface 23 of the backing or supporting ring member with which it is associated so that this face of the insert ring is spaced above or inwardly of that of the backing member. This arrangement eliminates the necessity of accurately finishing and lining up side surfaces 20 of the insert ring, doing away with a large number of chucking operations required in finishing the one-piece solid bearing now generally employed. The elimination of a large number of chucking operations thus greatly reduces the cost of manufacture, increases the percentage of bearings which are constructed to the proper dimensions, thus decreasing the percentages of rejected bearings, and secures the necessary accuracy with less difficulty.

Because the face 22 having the track or raceway is spaced above the adjacent surfaces 23 of the backing member a portion of each side wall of the insert ring, indicated at 24, is exposed and not covered by the metal or material of the backing member. These uncovered surfaces are important as providing gripping surfaces to be properly gripped and hold the insert ring in the die by suitable holding means during the casting and molding operations and also for later grinding or finishing of the raceway. If the insert ring is merely slid or forced onto the die pin it is very apt not to be held in the proper position during the casting or molding operation because as soon as the hot metal or other material hits it, it is heated and expands faster than the large bulk of the die pin and therefore the ring loosens on this pin and is liable to be tilted sideways or otherwise forced out of position by the pressure of the material or the metal forced into the mold. With this present construction the insert ring can be gripped and held in the mold by its opposite sides 24 with no danger of its being loosened by heating from the die casting metal or other material, and then forced out of position by the pressure of this metal or other molding material.

Because the ring can be so gripped and held either during molding or casting operations or for finishing of the raceway, a large number of chucking operations are avoided which are necessary in the solid or one-piece bearing now generally employed, thus doing away with the large number of variables in the bearing that cause such unsatisfactory performance as to lead to rejection by the customer. The surfaces 23 and 24 also form spaces where all types of shields, plates, labyrinths, seals or other grease, dirt or oil protecting elements may be easily attached. Basically these variables are due to the many chucking operations required for the many step-by-step operations needed in finishing the bearing ring of the present standard methods of ball bearing manufacture. This also applies to all types of ball, roller and thrust bearings. From observation of these present-day bearings it is readily apparent that the diameter surfaces of the rings must be parallel, that the ring surfaces must be parallel, that the raceways must be parallel with both faces and diameter and that all must be concentric (not eccentric) with each other for uniform or successful bearing performance. If these qualities are not rigidly maintained, wobble of the rings, of the faces, of the diameters or other errors of combinations of these faults will quickly cause bearing failure and wrecking of the bearing.

In the present construction, however, the pulley or similar article has a standard proportioned bearing with the outer or backing ring section of the outer ring of the bearing cast, molded or bonded to the raceway ring, and also of a size and shape to complete the pulley or similar article including the grooved or flat or other surface or construction at its periphery so that the belt pitch line or belt carrying surface, or other driving surface, is exactly positioned with reference to the raceway surface for the rolling elements. This introduces a simple construction in which a large proportion of the finishing operations required in the usual construction of the bearing ring are eliminated as well as those of the standard pulley hub. The usual pulley hub insert may also be eliminated. In short, this invention permits a construction in which the outer ring section of the bearing and the pulley itself may comprise only two elements with the outer ring or backing-up portion 13 shaped at one side to form a pulley or similar element. The surface 12 is exactly positioned and aligned with the surface 15 so that all errors of wobble and eccentricity are completely eliminated, providing a new improvement in the art of greater accuracy of the finished article and far lower cost of its construction through the elimination of many previous machining operations.

The pulley or sheave bearing has the same inner ring exactness in relation to the surfaces 15a and 26a of the inner bearing section. At high speeds this invention provides a far greater degree of smoothness of operation as the greater proportion of all factors of machining error, such for example as wobble and eccentricity, are entirely eliminated.

The inner ring section comprising the insert ring 25 and the backing-up and supporting ring 26 may be mounted on a shaft or other supporting member (not shown) between which and the body of the pulley will be relative rotation. The insert ring 25 may be the same as the ring 14, only reversed, and the backing and supporting member 26 may be molded or cast or otherwise formed the same as is the backing and supporting member 13 of the pulley, the side walls 25a of the insert or raceway ring being spaced inwardly from the side walls 26c of backing member 26 and extending above the surfaces 26b to form gripping surfaces the same as in the outside ring. Seals or other protecting elements 27 may be located on each side of the raceway rings to retain lubricant in the bearing and keep out foreign matter whether of a solid or fluid nature. These seals may be of any desired type and secured in any way desired. They may be of metal, leather, felt or other suitable material, and would ordinarily be carried by the outer member 10 with their inner edges contacting and running on the outer surface of the inner member 26.

In the other figures of the drawing are illustrated how this construction and arrangement may be employed with other types of pulleys and similar devices. In Fig. 2 the periphery 28 of the body portion 29 may be flat or slightly crowned for use with flat belts, but the central antifriction bearing construction and arrangement is the same as that shown in Fig. 1. In fact in each of the devices in the various figures shown the central antifriction bearing construction is the same. In Fig. 3 the periphery of the body 30 is formed with a V-shaped groove 31 for running with a V-belt. In Fig. 4 the body 32 has teeth or similar projections 33 on its periphery for cooperating with a flexible chain running thereon. In Fig. 5 the body 34 has gear teeth 35 on its periphery to cooperate with a suitable spur gear cooperating therewith and running on it. In Fig. 6 the body 36 is constructed on its periphery at 37 to form a worm gear to cooperate with a suitable worm.

In Fig. 7 is shown a modified form which instead of being cast or molded about the insert raceway ring the backing and supporting member forming the pulley or similar body is preformed and then the raceway ring is bonded to it, preferably by copper brazing in a controlled or neutral atmosphere. Here the pulley body is made up of two members 41 and 42 which may be preformed of different or softer metal, or even of similar metal, by stamping, drawing and forming operations from sheet metal of suitable gauge, forging or otherwise, and then the raceway ring 14 permanently bonded thereto. They are formed with the flanges 43 and 44, and web portions 45 and 46 placed side by side and secured together, the flanges 43 and 44 forming the peripheral groove 55 for the driving belt. The hub or ring section 47 forms the backing and supporting member for the ring 14 and corresponds to the section 13 of the other forms. It is ordinarily of a thickness to fill out the size of the bearing to the standard size of the standard solid bearing although it may be thicker if desired. The members 41 and 42 can be permanently secured together by any suitable means preferably by copper brazing in a controlled atmosphere at the same time the ring 14 is bonded to the portion 47. In doing this, a copper wire 48 is wrapped around the periphery of the members at the joint between them and a similar copper wire 49 placed at the junction between the members 14 and 47. When heated in a controlled atmosphere these wires melt and the metal rungs between the contacting surfaces permanently bonding them together so they will not be separable by heating. This makes the body or backing and supporting member an integral member and in effect one piece. Thus the assembly could while so heated for brazing be kept hot for the soaking and quenching operations of hardening the ring without hardening or warping of the backing member if of non-hardening materials, such as some mild steels, thereby reducing numerous chucking and other finishing operations required of the standard one-piece bearings. The web 45 may be extended beyond the ring section 47 as indicated at 50 to form a stop shoulder for one side of ring 14 to facilitate locating it at the proper location. It will also be seen that the ring 14 is of less width than the backing and supporting member so that the sides 24 of the ring 14 are spaced inwardly from the sides 51 and 52 of the pulley. Also the surface 22 having the raceway is of a different diameter from the adjacent surfaces 53 and 54 of the backing member so as to be spaced above them to form gripping and holding surfaces as described in connection with the other forms. It can have the same seals 27 as in the other forms if desired.

In each instance the body of the pulley or similar article, together with the backing or supporting member 13, may be formed, molded or cast as described in connection with Fig. 1, and with the same materials. Thus, in each of the forms illustrated, which are shown by way of example, there being of course numerous other applications, the insert raceway rings may be of tough hardened steel or other suitable hardened metal. The balance of the bearing members consisting of the backing-up ring section or members 13 and the various body portions formed therewith can be made of softer and more readily workable materials than the tough hard alloy metal required for the insert raceway ring, as the load from these insert rings is distributed over large areas. Thus the backing and supporting material for the insert raceway rings to support and assist in preventing distortion of these rings as well as hold them in proper position, can be of a softer alloy or other molded or cast material. This backing material may be of die-casting materials and alloys such for example as zinc, magnesium, aluminum, brass or bronze alloys in common use, which have excellent physical properties for this compression service, and the backing-up ring members can be made in a die-casting machine, plastic molding machine, by permanent mold methods or the centrifugal mold method, etc.

The powder molding methods are particularly adapted for making the backing member and forming it about the raceway ring. This includes powder metallurgy and powder plastics in the many ways of applying them. Thus for example they may include their use as pure powders handled under very high pressures as in powder metallurgy, or the molding of metal powders mixed with a proper percentage of a suitable binder under great pressure in molds, the binder acting as a bond for the metal particles. The use of metallic powders has particular value in this invention to insure rapid conduction of heat away from the bearing under heavy operating conditions of load or speed than would be possible with nonmetallic plastics or similar materials. To produce the backing-up members having inserted raceway rings, the insert rings can be suitably held and accurately positioned in the dies or molds and the liquid metal poured or cast about them or molded under pressure to produce the finished ring formed accurately to size, so that only sizing operations may be necessary.

With this construction the bearing may be gripped and held by the surfaces 24 on the opposite sides of the track or raceway ring during the final finishing and grinding of the peripheral or driving surfaces of the pulley, sprocket or similar device and the track or raceway surface 15. Therefore these surfaces can be readily finished and located in exact radial and axial concentric alignment with each other, as they may be finished in the same single chucking operation. The peripheral working portion is therefore located in exact radial and axial concentric alignment with the track or raceway and vice versa.

Therefore in each instance or example shown the belt pitch line, the sprocket pitch line 38, and the pitch lines 39, 40 of the gears at the periphery can readily be properly and exactly positioned with reference to the raceway surface for the rolling elements, which is very difficult if not practically impossible with the old constructions. This is extremely important for smooth and efficient running or operation, especially at high speeds.

It is to be noted that this two-material ring construction wherein the raceway surface provides a very hard standard surface for the balls or rollers of any type of bearing, may have the backing ring or section of very light material cast, molded or bonded to the raceway ring, assuring the very lightest possible weight for such construction applications as aircraft, as well as decrease in the time required to manufacture and the amount of steel required in the manufacture, thereby conserving vital materials which may be required for other purposes.

I am, however, not limited to the use of metal for the backing-up or mounting rings or sections, but may use other molding materials, as liquids, powders or plastics under high pressure or by centrifugal force. Thus in addition to the metals and the alloys mentioned may be used acrylic, cellulose acetate, phenolic resins, urea, vinyl, etc., among the various molding plastics, and the mild soft steels, hard steel alloys, manganese bronzes or other high melting point alloys for the centrifugal permanent mold casting method, and for powdered metals molded under high pressure either with or without the binder.

The backing and supporting material brings the bearings to standard size and the raceway ring is permanently bonded to it or inseparably mounted on it. The terms "bonded" or "inseparably mounted" include casting, molding or forming the backing material about or against the ring, controlled atmosphere brazing, brazing, sweating and soldering, or otherwise bonding or connecting so they are inseparable in use and in effect one piece.

Throughout the specification and claims I have used the terms "casting" and "molding" as practically synonymous, as castings are formed and shaped in molds and therefore casting is broadly a molding operation. Also, shaping and molding such materials as the non-ferrous plastics and powdered metal may be broadly called a casting operation as they are shaped in molds.

Although hardened steel has been mentioned as the material that would probably be most generally used for the insert raceway ring, it is to be understood that the invention is not limited to the use of this material. Thus, for example, stainless steel is often required, or the use of bronze or glass may be required as materials for special jobs, such as would be needed on process industries in the presence of acid in gaseous or liquid form.

In all cases the backing material is of a degree of hardness to support the load from the raceway ring without change from its repose dimensions as contrasted with a yieldable backing for vibration dampening applications.

Having thus set forth the nature of my invention, what I claim is:

1. A device of the character described comprising a bimaterial unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body member being of different material than the ring but of a degree of hardness to withstand the load without materially changing its repose dimensions, and said ring having an unfinished outer surface permanently bonded to the material of the body to mount and hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

2. A device of the character described comprising a bimetal unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body member being of different metal pressure cast against the ring and of a degree of hardness to withstand the load without materially changing its repose dimensions, and said ring having an unfinished outer surface permanently bonded to the metal of the body to hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

3. A device of the character described comprising a bimaterial unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body member being of a different material than the ring but of a degree of hardness to withstand the load without materially changing its repose dimensions, said raceway ring being of less width than the body member so that its side walls are spaced inwardly of the side walls of the body and the diameter of its face having the track being different from that of the adjacent surface of the body member so that it is spaced above this surface, and said ring having an outer surface permanently bonded to the material of the body to hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

4. A device of the character described comprising a bimetal unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body member being made of formed metal of the size and shape of the finished member and of a degree of hardness to withstand the load without materially changing its repose dimensions, said raceway ring being of less width than the body member so that its side walls are spaced inwardly of the side walls of the body and the diameter of its face having the track being different from that of the adjacent surface of the body member so that it is spaced above this surface, and said ring having an outer surface permanently bonded to the metal of the body by copper brazing in a controlled atmosphere to hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

5. A device of the character described comprising a bimetal unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body member being of different metal pressure cast to substantially finished size against the ring and of a degree of hardness to withstand the load from the ring without materially changing its repose dimensions, said raceway ring being of less width than the body member so that its side walls are spaced inwardly of the side walls of the body, and said ring having an unfinished outer surface permanently bonded to the metal of the body to hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

6. A device of the character described comprising a bimetal unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body including a pair of preformed metal members comprising web portions secured together and flange portions at the periphery thereof forming the means to cooperate with the driving means, said body including a ring section embracing the raceway ring to form a supporting and mounting means therefor, and said ring having an outer surface permanently bonded to the metal of the body by copper brazing in a controlled atmosphere to hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

7. A device of the character described comprising a bimetal unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body including a pair of preformed metal members comprising web portions secured together and formed at their peripheries to provide said means to cooperate with a driving means, said body including a ring portion embracing the raceway ring to form a supporting and mounting means therefor and being of a different metal from that of the ring but of a degree of hardness to withstand the load from the ring without materially changing its repose dimensions, one of said members being extended inwardly beyond the outer periphery of the ring to form a shoulder to engage one side of the ring to locate it within the ring section, and said ring having an outer surface permanently bonded to the metal of the body by copper brazing in a controlled atmosphere to hold the ring permanently in a given position in said body whereby the track surface may be finished with respect to the pitch line of said working periphery after mounting of the ring in the body and bonding it thereto so that the track surface may be brought into exact axial and concentric alignment with the pitch lines of the working periphery of the body member.

GEORGE H. KENDALL.